United States Patent
Di Lisa et al.

(10) Patent No.: US 12,187,302 B2
(45) Date of Patent: Jan. 7, 2025

(54) VEHICLE SYSTEM WITH ADJUSTABLE DRIVABILITY PARAMETERS

(71) Applicant: DANA ITALIA S.R.L., Trentino (IT)

(72) Inventors: Alessandro Di Lisa, Arco (IT); Lorenzo Dalla Palma, Arco (IT)

(73) Assignee: DANA ITALIA S.R.L., Trentino (IT)

( * ) Notice: Subject to any disclaimer, the term of this patent is extended or adjusted under 35 U.S.C. 154(b) by 65 days.

(21) Appl. No.: 17/449,248

(22) Filed: Sep. 28, 2021

(65) Prior Publication Data
US 2023/0098827 A1 Mar. 30, 2023

(51) Int. Cl.
*B60W 50/08* (2020.01)
*B60R 16/023* (2006.01)
*B60W 10/02* (2006.01)
*B60W 10/113* (2012.01)
*B60W 10/188* (2012.01)

(52) U.S. Cl.
CPC ......... *B60W 50/082* (2013.01); *B60R 16/023* (2013.01); *B60W 10/024* (2020.02); *B60W 10/113* (2013.01); *B60W 10/188* (2013.01); *B60W 2510/18* (2013.01); *B60W 2710/027* (2013.01); *B60W 2710/18* (2013.01)

(58) Field of Classification Search
CPC ............ B60W 50/082; B60W 10/024; B60W 10/113; B60W 10/188; B60W 2510/18; B60W 2710/027; B60W 2710/18; B60R 16/023
See application file for complete search history.

(56) References Cited

U.S. PATENT DOCUMENTS

| | | | | |
|---|---|---|---|---|
| 10,926,779 | B1* | 2/2021 | Sullivan | B60W 10/04 |
| 2009/0312142 | A1* | 12/2009 | Minamikawa | B60W 20/13 477/3 |
| 2010/0082189 | A1* | 4/2010 | Xu | B60L 15/20 701/22 |
| 2010/0305822 | A1* | 12/2010 | Kresse | F16H 61/0213 701/56 |
| 2011/0202222 | A1* | 8/2011 | Yamamoto | B60W 20/00 180/65.265 |
| 2012/0078467 | A1* | 3/2012 | Schweikl | B60K 26/021 701/36 |
| 2013/0275023 | A1* | 10/2013 | Gregg | F02D 41/10 701/102 |
| 2014/0004994 | A1* | 1/2014 | Wang | B60K 6/445 477/3 |
| 2014/0128210 | A1* | 5/2014 | Noh | F16H 3/62 475/311 |
| 2017/0240175 | A1* | 8/2017 | Miwa | B60K 20/08 |
| 2017/0363019 | A1* | 12/2017 | Frieden | F02D 11/10 |

* cited by examiner

Primary Examiner — Naeem Taslim Alam
(74) Attorney, Agent, or Firm — McCoy Russell LLP (57) ABSTRACT

Methods and systems for tuning vehicle drivability are provided. The vehicle system includes, in one example, a vehicle control unit (VCU) that is designed to electronically communicate with a human machine interface (HMI). In the system, the VCU is designed to, in reaction to receiving an acceleration or deceleration request from the HMI, send a virtual acceleration or deceleration command to a transmission control unit (TCU), where the virtual acceleration or deceleration command correlates to the acceleration or deceleration request and the correlation is user adjustable via a user interface (UI) of the VCU.

18 Claims, 5 Drawing Sheets

VEHICLE SYSTEM WITH ADJUSTABLE DRIVABILITY PARAMETERS

TECHNICAL FIELD

The present disclosure relates to a vehicle system with control units that are designed to provide drivability parameter tuning.

BACKGROUND AND SUMMARY

Some vehicle controllers have been designed to provide base drivability controls that map operator input to vehicle acceleration and deceleration. The base correspondence between operator input and tractive performance in these controllers remains fixed. Attempts have been made to provide pre-set performance modes that deliver different selectable pre-set maps between accelerator pedal position and acceleration. Other prior systems have used convoluted tuning procedures to alter the tractive performance parameters in both the vehicle controller and the transmission controller. In these prior systems, customers are unable to alter the tractive performance parameters due to the programmatic complexity of the tuning procedures.

The inventors have recognized several drawbacks with previous procedures for tuning or otherwise managing vehicle drivability parameters. For instance, in systems which provide a limited number of selectable pre-set drivability modes, these modes may not complement drivability demands of certain customers. Thus, the pre-set drivability modes may lead to a mismatch between a customer's drivability preferences and the selected pre-set modes. In particular, customers may want greater flexibility with regard to the adjustability of drivability parameters such as vehicle acceleration and deceleration behavior (e.g., drive and brake pedal progressivity). For instance, certain customers may desire alterations of drivability parameters to conform to driver habits. In previous vehicle and transmission systems, changes in these drivability characteristics may necessitate arduous, time consuming, and costly alterations to drivability programs in different controllers during manufacturing, prior to the customer receiving the vehicle system. When multiple consumers have varying demands for selected drivability characteristics, the development time and cost issues may be further exacerbated.

The inventors have recognized the abovementioned challenges and developed a vehicle system to overcome at least a portion of the challenges. The vehicle system includes, in one example, a vehicle control unit (VCU) that is designed to electronically communicate with a human machine interface (HMI). The VCU is designed to, in reaction to receiving an acceleration or deceleration request from the HMI, send a virtual acceleration or deceleration command (e.g., a virtual pedal position) to a transmission control unit (TCU). In such an example, the virtual acceleration or deceleration command correlates to the acceleration or deceleration request and the correlation is user adjustable via a user interface (UI) of the VCU. In this way, the VCU provides an interface which permits a user (e.g., a customer such as an original equipment manufacturer (OEM)) to efficiently tune a base set of selected drivability parameters. Customer satisfaction is consequently increased.

Further, in another example, the VCU may send a user designated tractive torque constraint to the TCU. Additionally, the TCU may adjust the distribution of tractive torque between the transmission and the drive axle using the virtual acceleration or deceleration command and the tractive torque constraint. The user designated tractive torque constraint and the correlation between the requested and virtual acceleration or deceleration may be a selected sub-set of a larger group of the drivability parameters. The drivability parameters that are not user-selectable may be stored in the TCU and executed as part of a transmission control framework. By selecting the torque constraint and the virtual and requested acceleration correlation for customer adjustability at the VCU, the customer may effectively tune these drivability parameters according to their predilection. Vehicle performance may resultantly more aptly match operator preferences and the vehicle's intended operating environment. However, by executing the remainder of the drivability parameters in the TCU, complex drivability reprogramming associated with these parameters can be avoided, if wanted. In this way, the system may be quickly tuned by different customers to alter a targeted sub-set of drivability parameters. Consequently, the system may appeal to a wider group of customers without necessitating extensive redesign of other programmatic aspects of the control units for each customer, if wanted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A vehicle system that strategically manages vehicle drivability characteristics in both a transmission control unit (TCU) and a vehicle control unit (VCU) is described herein. The system permits a customer to selectively adjust a set of base drivability characteristics such as progressivity curves of pedal behavior (e.g., an accelerator pedal position vs. positive torque applied to a transmission output and a brake pedal position vs. negative torque applied to the transmission output). In this way, the system's flexibility with regard to drivability parameter tuning is increased. The base drivability parameters may be a sub-set of a larger group of drivability parameters. This sub-set of drivability parameters may be stored, adjusted, and executed by the VCU while the remainder of the drivability parameters may be stored and executed by the TCU. In this way, parameters, whose adjustability may be demanded by customers, may be efficiently provided for tuning at a VCU interface, while the other parameters, which may have greater complexity, are implemented by the TCU. Thus, some of the drivability parameters may be guarded from customer adjustment in the TCU, while a base set of drivability parameters are provided to the customer for tuning by the VCU. The tunable drivability parameters may further include tractive torque constraints such as a positive tractive torque limit and a negative tractive torque limit. Specifically, the VCU may generate a user interface (UI) via a controller area network (CAN) that permits the operator to adjust the aforementioned drivability characteristics. In this way, customers such as original equipment manufacturers (OEMs) are provided with greater flexibility in respect to drivability parameter tuning.

Figure 1:
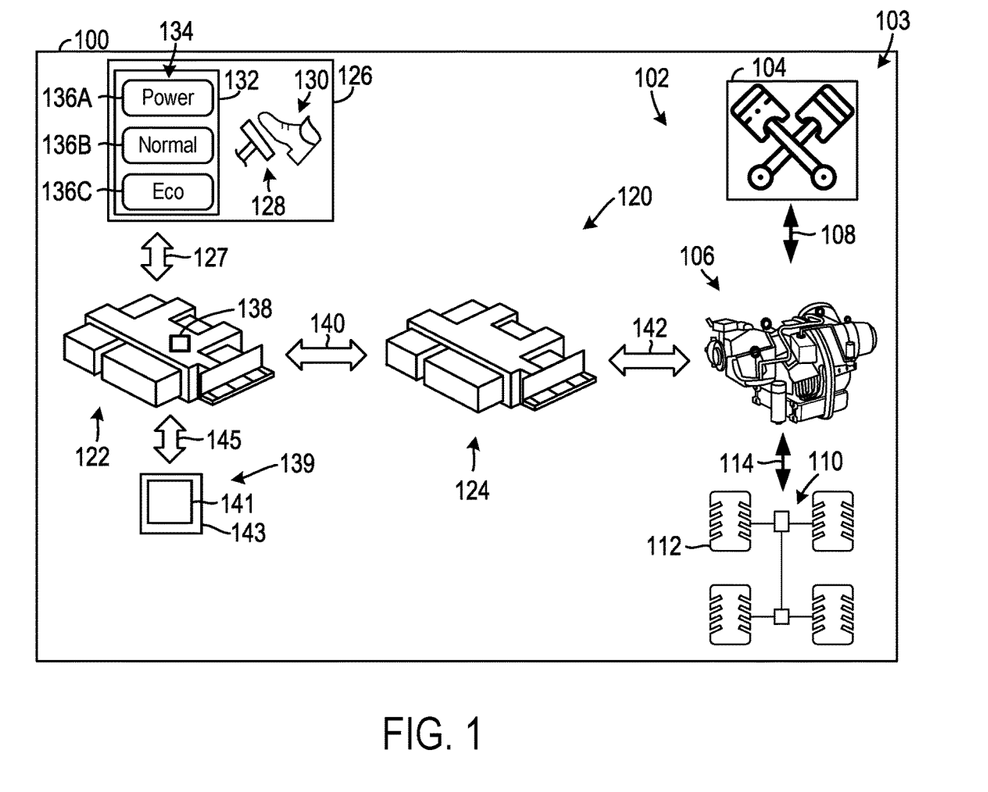
FIG. 1 shows a vehicle with a control system designed for drivability parameter tuning.

FIG. 1 shows a schematic illustration of a vehicle 100 with a powertrain 102. The powertrain 102 may be included in a vehicle system 103. The vehicle 100 may be an off-highway vehicle, in one example, although vehicles designed with on-highway capabilities have been envisioned such as passenger and commercial vehicles. An off-highway vehicle may be a vehicle whose size and/or maximum speed precludes the vehicle from being operated on highways for extended durations. For instance, the vehicle's width may be greater than a highway lane and/or the vehicle top speed may be below a minimum allowable highway speed. Industries and the corresponding operating environments in which the vehicle may be deployed include forestry, mining, agriculture, construction, oil and gas, and the like.

The powertrain 102 includes a motive power source, specifically depicted as an internal combustion engine 104. However, the vehicle 100 may additionally, or alternatively, include a traction motor. As such, the vehicle may be an electric vehicle (EV) or a hybrid electric vehicle (HEV), in different examples.

The powertrain 102 further includes a transmission 106 that is mechanically coupled to the engine 104. Arrows 108 signify the flow of mechanical power between the engine 104 and the transmission 106. In one example, the transmission 106 may be a hydromechanical variable transmission (HVT). For instance, the transmission may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in a discrete set of ratios. Alternatively, the transmission 106 may be another type of continuously variable transmission (CVT) capable of seamlessly shifting through a continuous range of gear ratios, such as a hydrostatic CVT that uses a variable displacement pump and a hydraulic motor, for instance. Other suitable automatic transmissions such as dual-clutch transmissions (DCTs) that employ two input clutches, may be used, in the vehicle, in other examples.

The transmission 106 is coupled to one or more drive axles 110 and corresponding drive wheels 112. These drive axles may include conventional components such as differentials, axle shafts, and the like. Arrows 114 signifies the transfer of mechanical power between the transmission 106 and the drive axles 110.

The vehicle 100 further includes a control system 120 with a vehicle control unit (VCU) 122 and a transmission control unit (TCU) 124 in electronic communication with one another. The control unit connectivity may be carried out via a controller area network (CAN), however other suitable electronic communication protocols have been contemplated. Each of the control units 122, 124 may include one or more microprocessors and memory that hold instructions executable by the corresponding microprocessor. Further, the control units may be housed in separate enclosures and spaced away from one another, in one example. However, in an alternate example, at least a portion of the control unit components may be collocated.

A human machine interface (HMI) 126 may further be included in the vehicle 100. The HMI 126 is in electronic communication with the VCU 122 which is indicated via arrows 127. Said electronic communication may be implemented via wired and/or wireless communication protocols. The HMI 126 may include one or more input devices such as one or more pedal(s) 128 (e.g., an accelerator pedal and/or a brake pedal). Thus, the input devices may include both a brake pedal, an accelerator pedal, and the like that permit a vehicle operator to generate acceleration and deceleration requests. A vehicle operator 130 is shown interacting with the pedal(s) 128. Responsive to operator interaction, the pedal(s) 128 may send a signal indicative of its position to the VCU. The pedal position signal may be expressed as a percentage of maximum pedal depression by the control units. However, other schemes for representing the pedal position may be used.

The HMI 126 may further include a display 132 with a graphical user interface (GUI) 134 presented thereon which enables the operator to select one of multiple drive modes 136A, 136B, and 136C. For instance, the GUI may be a touch interface and/or manipulated via peripheral devices, buttons, knobs, sliders, combinations thereof, and the like. Specifically, in the illustrated example, the drive modes include a power mode where rapid acceleration and deceleration are favored over efficiency, a normal operating mode (e.g., a mode where neither rapid accelerator nor efficiency are favored, for instance), and an economy mode (ECO) mode where powertrain efficiency is favored over rapid acceleration. Additional or alternative types of operating modes may be provided by the HMI, in other examples, which may provide more granularity with regard to the balance of the vehicle system's tractive performance and efficiency.

The VCU 122 may include a CAN bus 138 for electronic communication with the TCU 124. More generally, arrows 140 signify the data transfer between the VCU 122 and the TCU 124. The VCU 122 may generally be designed to coordinate operation of the TCU as well as other control units such as an engine control unit (ECU), an implements control unit (ICU), and the like. The VCU 122 may further be designed to control auxiliary devices and systems such as an alternator, a water pump, a fan drive, a brake pump, an energy accumulator, an engine retarder, and the like.

The VCU 122 may provide a UI 139 to a customer (e.g., an OEM) that allows drivability parameters such as acceleration and braking progressivity and torque constraints (e.g., limits). In one example, the UI 139 may include a graphical user interface (GUI) 141 presented on a display 143. As described herein, acceleration and braking progressivity may refer to the shape of a curve correlating actual pedal position to a virtual pedal position. Further, the torque constraints may correspond to maximum torque values (e.g., positive or negative output torque applied at the transmission's output). The UI 139 may be sent over the CAN to the display 143 as denoted via arrow 145. The display 141 may be included in a computing device with a processor, memory, peripheral devices, and the like that permit customers to adjust the selected set of drivability parameters.

Figure 7:
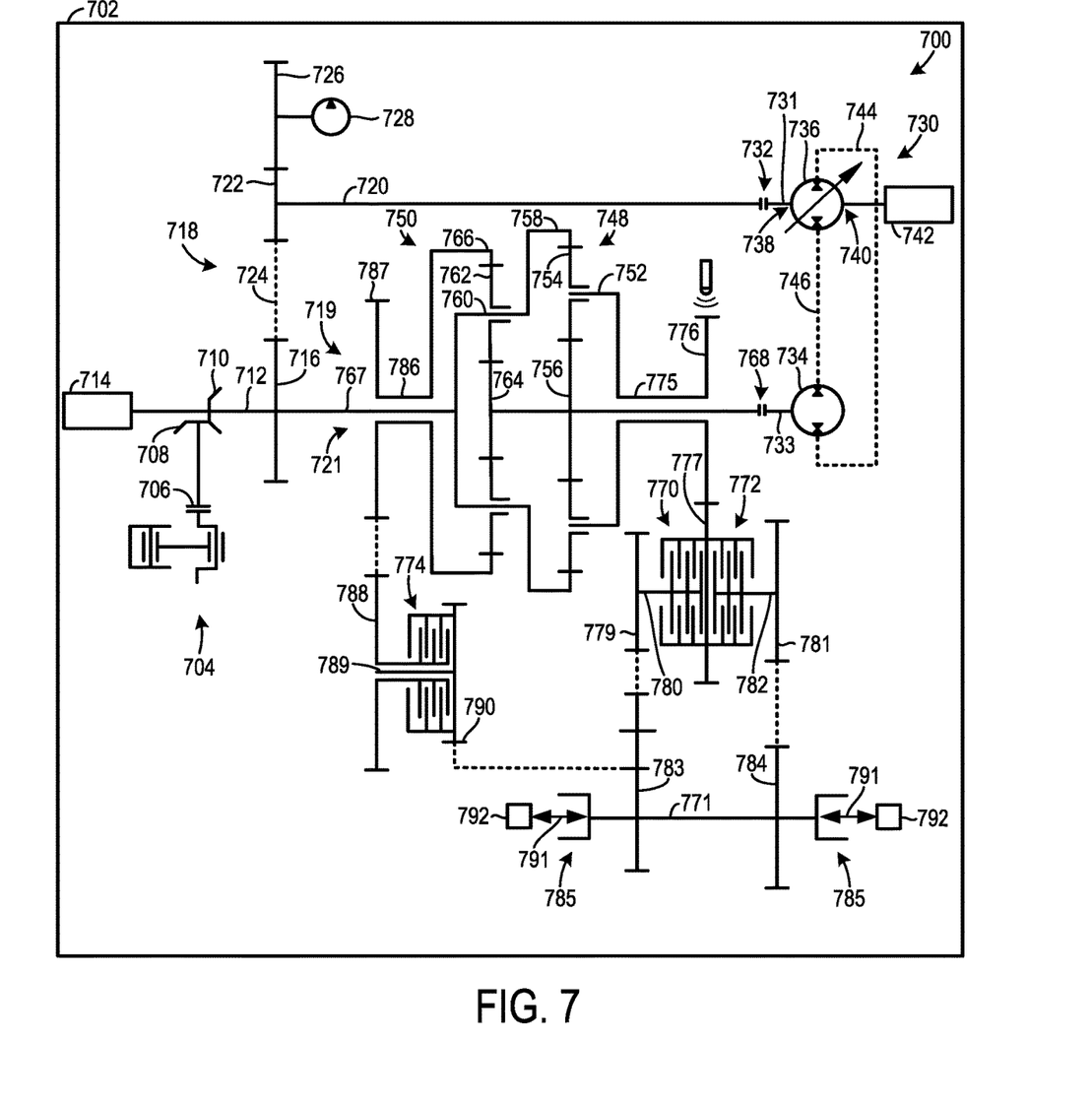
FIG. 7 shows a schematic representation of an exemplary hydromechanical transmission.

Further, the TCU 124 is in electronic communication with the transmission 106, as signified by arrows 142. Specifically, the TCU 124 may be designed to adjust operation of clutches, hydraulic pumps, hydraulic motors, and the like in the transmission 106. An example of a hydromechanical transmission is shown in FIG. 7 and discussed in greater detail herein. Specifically, in one example, the TCU 124 may execute a power management module that strategically distributes mechanical power to implements that are attached to power take-offs (PTOs) in the transmission 106 and the drive axles based on power management priorities.

Figure 2A:
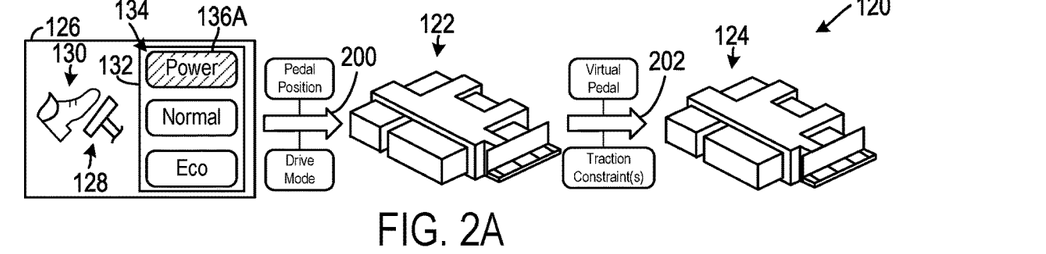
FIGS. 2A-2B show data flow through the control system depicted in FIG. 1 in different driving modes.
Figure 2B:
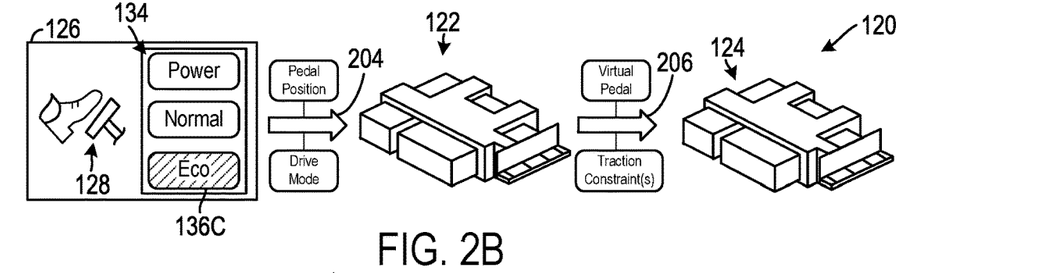

FIGS. 2A and 2B depict data flow schemes that occur while the control system 120 operates in the power mode and the ECO mode, respectively. However, as previously indicated, other mode designations may be utilized, in alternate examples.

Turning specifically to FIG. 2A, the operator may have previously selected the power mode 136A via interaction with the GUI 134 presented on the display 132 in the HMI 126 of FIG. 1. Further, the operator 130 interacts with the pedal 128, and this interaction signifies an operator's acceleration or deceleration request (e.g., a desired amount of vehicle acceleration or deceleration). The pedal may be designed to progress through a range of travel from a minimum depression value to a maximum depression value. As such, the pedal position may be expressed as a percentage of the maximum depression. However, other suitable schemes for representing pedal depression have been envisioned.

As shown in FIG. 2A, a signal 200 indicative of a pedal position and/or drive mode selection (power mode, in the illustrated example) is sent from the HMI 126 to the VCU 122. In response to the VCU 122 receiving the signal 200, the VCU may interpret the drive mode selection and/or pedal position data and responsively generate data indicative of a virtual pedal position and/or traction constraint(s). The traction constraint(s) may be a maximum acceleration and/or deceleration limit. In other words, the traction constraint may put a limit on how much torque (positive or negative) can be applied to the transmission's output. Further, as discussed in more detail herein, the traction constraints may be parameters that are adjustable by the customer. The virtual pedal position signal may be correlated (e.g., mapped) to the actual pedal position via a progressivity curve that is designated by the operating mode selected by the operator. Similar to the traction limit, the progressivity curve may be altered by a customer such as an OEM. For example, a GUI may be provided over the CAN to enable customers to change the shape of the progressivity curve. After generating the virtual pedal data and/or the traction constraint data, a signal 202 indicative of said data may be sent to the TCU 124. Responsive to the TCU receiving the virtual pedal and/or traction limit data, the transmission may be adjusted via TCU control to apply torque to the transmission's output to satisfy the virtual pedal request and/or constrain the applied torque within the torque limits. However, in other examples, only the virtual pedal data or the traction constraint data may be sent to the TCU from the VCU. In such an example, the transmission may be controlled using the virtual pedal data or the traction constraint data.

Referring to FIG. 2B, the operator may have previously selected the ECO mode 136C via interaction with the GUI 134 in the HMI 126. As shown, a signal 204 indicative of a pedal position and/or the ECO mode selection is sent to the VCU 122 from the HMI 126. The VCU 122 again interprets the data but generates different virtual pedal data and/or traction constraints based on the ECO mode selection. As such, the virtual pedal data and/or the traction constraint data associated with the ECO mode is then sent from the VCU 122 to the TCU 124, as indicated via arrow 206. In this way, the VCU can efficiently process the actual pedal position and mode selection data and generate an abstract representation of the data that may more closely match a customer's drivability demands.

Figure 3A:
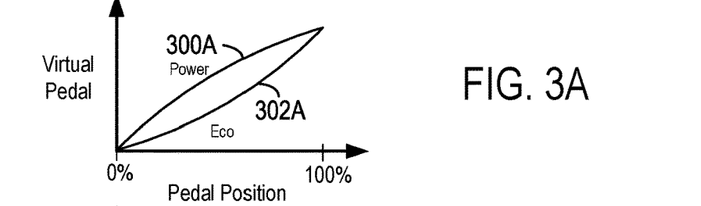
FIGS. 3A-3D show graphical depictions of the correlation between a pedal position and a virtual pedal value as well as the vehicle's corresponding dynamic behavior.
Figure 3B:
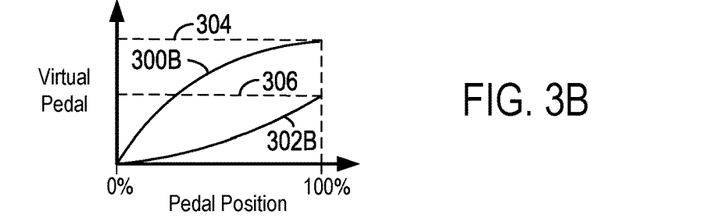

FIGS. 3A and 3B show prophetic progressivity curves of virtual pedal position vs. actual pedal position for an accelerator pedal or a brake pedal. Thus, virtual pedal position is on the abscissas and actual pedal position is on the ordinates. An actual pedal position of 0% indicates that the pedal in an undepressed state, while 100% indicates the pedal in its fully depressed state. FIG. 3A specifically shows base progressivity curves 300A, 302A in the power mode and the ECO mode, respectively. As shown, the power mode's progressivity curve 300A rises more rapidly as the pedal is initially depressed.

FIG. 3B shows how a customer may alter the shape of the progressivity curves and/or the maximum values of the progressivity curves that correspond to the different modes. For instance, the power mode's progressivity curve 300B is made steeper and therefore will cause the vehicle to more rapidly accelerate or decelerate when the pedal is depressed and moves through its stroke. Conversely, the ECO mode's progressivity curve 302B is made more gradual and therefore will cause the vehicle to less rapidly accelerate or decelerate as the pedal is depressed.

The virtual pedal's maximum values (e.g., limits) in each of the power mode and the ECO mode are indicated at 304 and 306, respectively. The maximum values signify the maximum value that the virtual pedal signal may reach in the different modes. As illustrated, the virtual pedal's maximum value in the power mode is greater than the virtual pedal's maximum value in the ECO mode. This maximum value may affect the traction limits, discussed in greater detail herein.

Figure 3C:
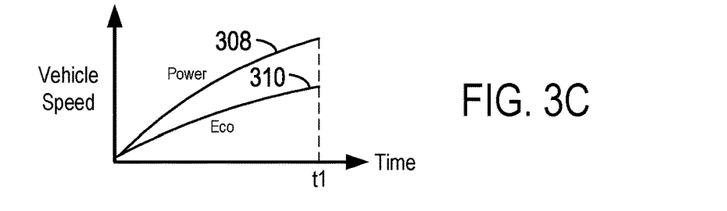
Figure 3D:
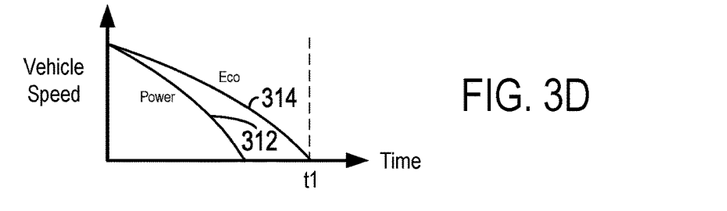

FIGS. 3C and 3D show prophetic plots of vehicle speed vs. time in scenarios when the pedal is an accelerator pedal and a brake pedal, respectively. As such, vehicle speed is on the abscissas and time is on the ordinates.

In particular, FIG. 3C illustrates plots 308 and 310 that correspond to the power mode and the ECO mode, respectively, during acceleration with constant pedal position, considering Virtual pedal vs. Pedal position characteristics as shown in FIG. 3A or FIG. 3B (e.g., pedal position 50%). As shown, the vehicle accelerates more rapidly in the power mode in comparison to the ECO mode.

FIG. 3D illustrates plots 312 and 314 that correspond to the power mode and the ECO mode, respectively, during deceleration with constant pedal position, considering Virtual pedal vs. Pedal position characteristics as shown in FIG. 3A or FIG. 3B (e.g., pedal position 50%). As shown, the vehicle decelerates more rapidly in the power mode in comparison to the ECO mode.

Figure 4A:
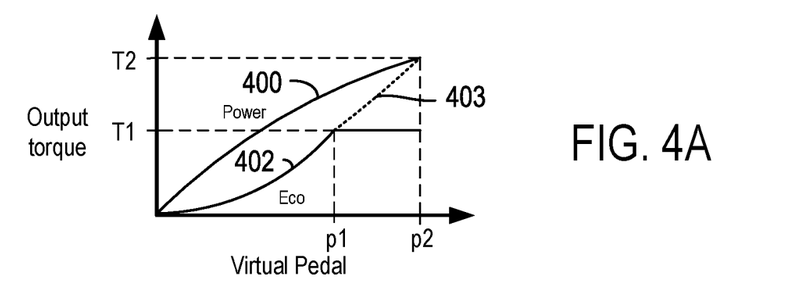
FIGS. 4A-4D show graphical depictions of the correlation between the virtual pedal value and the transmission's output torque and the vehicle's corresponding dynamic behavior.
Figure 4B:
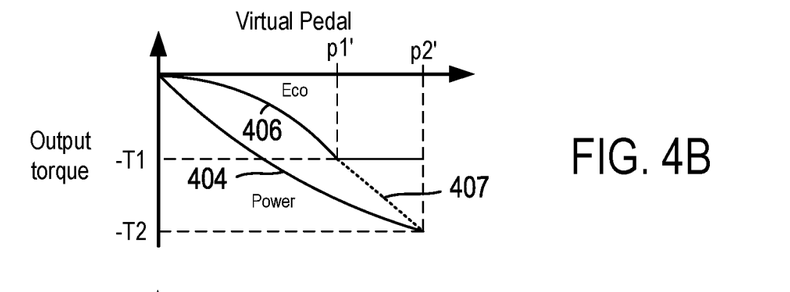

FIGS. 4A-4B illustrate prophetic plots of output torque vs. virtual pedal position with a plot 400 that corresponds to the power mode and a plot 402 that corresponds to the ECO mode. The output torque is on the abscissas and virtual pedal position is on the ordinates. In FIG. 4A, the torque is positive and the virtual pedal is therefore a virtualized accelerator pedal. On the other hand, in FIG. 4B, the torque is negative and the virtual pedal is therefore a virtualized brake pedal value.

In FIG. 4A, T1 represents a torque constraint (e.g., limit) for the ECO mode curve 402 and T2 represents a torque constraint for the power mode curve 400. Either of the torque limits may be adjusted by the customer to meet their preferences. For instance, the curve 402 is truncated at virtual pedal value p1. As such, any further accelerator pedal depression beyond p1, while the vehicle is operating in the ECO mode will not lead to the application of additional positive torque to the transmission's output shaft. Plot 403 shows an ECO mode curve that has not been truncated for comparison. On the other hand, at virtual pedal value p2, which may correspond to a maximum virtual accelerator pedal position, the power mode curve 400 reaches the torque limit T2. However, in other examples, the power limit curve may be truncated by the customer, if wanted.

FIG. 4B shows plots 404 and 406 that correspond to braking in the power mode and the ECO mode, respectively. −T1 represents a torque constraint for the ECO mode braking curve 406 and −T2 represents a torque constraint for the power mode braking curve 404. As shown, the ECO mode braking curve 406 be truncated at p1' and at virtual pedal value p2' the power mode braking curve 404 reaches −T2. Plot 407 shows an ECO mode curve that has not been truncated for comparison. Again, the customer may alter these curves and set the torque limits in each of the different modes and for each of the different HMI pedals.

Figure 4C:
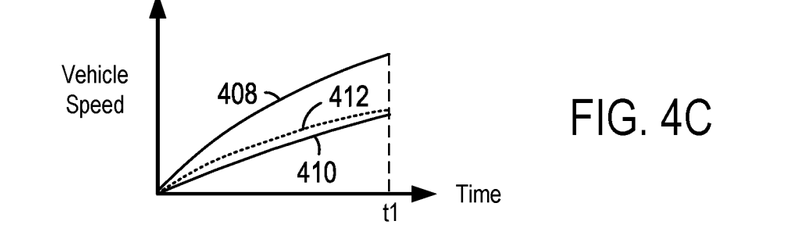

FIG. 4C shows plots 408, 410, and 412 for vehicle speed vs. time in the power mode, the truncated ECO mode, and the non-truncated ECO mode during acceleration, respectively, at constant virtual pedal (x), with p1<x<p2. Plot 408 specifically embodies vehicle dynamics constrained by the output torque vs. virtual pedal curve 400 shown in FIG. 4A. Plot 410 specifically embodies vehicle dynamics constrained by the output torque vs. virtual pedal curve 402 shown in FIG. 4A. Plot 412 specifically embodies vehicle dynamics constrained by the output torque vs. virtual pedal curve 403 shown in FIG. 4A. As depicted, the vehicle may accelerate more rapidly in the power mode and sequential less rapidly in the non-truncated ECO mode, and the truncated ECO mode.

Figure 4D:
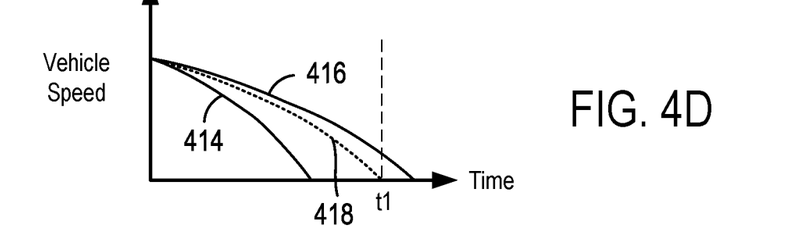

FIG. 4D shows plots 414, 416, and 418 for vehicle speed vs. time in the power mode, the truncated ECO mode, and the non-truncated ECO mode during deceleration, respectively, assuming a fixed virtual pedal (x), with p1<x<p2. Plot 414 specifically embodies vehicle dynamics constrained by the output torque vs. virtual pedal curve 404 shown in FIG. 4B. Plot 416 specifically embodies vehicle dynamics constrained by the output torque vs. virtual pedal curve 406 shown in FIG. 4B. Plot 418 specifically embodies vehicle dynamics constrained by the output torque vs. virtual pedal curve 407 shown in FIG. 4B. As depicted, the vehicle may decelerate more rapidly in the power mode and sequential less rapidly in the non-truncated ECO mode, and the truncated ECO mode.

Figure 5:
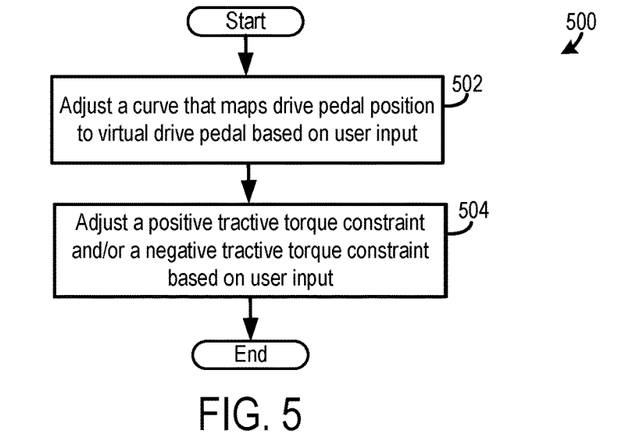
FIGS. 5 and 6 show different methods for operating a vehicle control system.

FIG. 5 illustrates a method 500 that enables a customer to tune drivability parameters. The method 500, as well as the other methods described herein, may be implemented by the vehicle systems and corresponding components described herein with regard to FIGS. 1-2B and FIG. 7. However, the method 500 and/or the other methods described herein may be implemented by other suitable vehicle systems and components. Further, performing the method steps in the method 500 and the other methods described herein may include sending and/or receiving commands which trigger adjustment of associate components, as previously indicated.

At 502, the method includes adjusting a curve that maps drive pedal position to virtual drive pedal based on user input. The curve may be adjusted by a customer using an interface that graphically represents the curve and enables alteration of the curve's shape. For instance, a user may increase the curve's initial progressivity while making a second part of the curve more linear. However, numerous suitable types of graphical correspondence between the pedal position and the virtual pedal position have been contemplated.

At 504, the method includes adjusting a positive tractive torque constraint and/or a negative tractive torque constraint based on user input. For instance, a customer may set the limits of the torque applied to the drive axles via the transmission for each of the modes of operation (e.g., a power mode, a normal mode, and/or an ECO mode). The limits may specifically be set for a brake pedal and/or an acceleration pedal.

Figure 6:
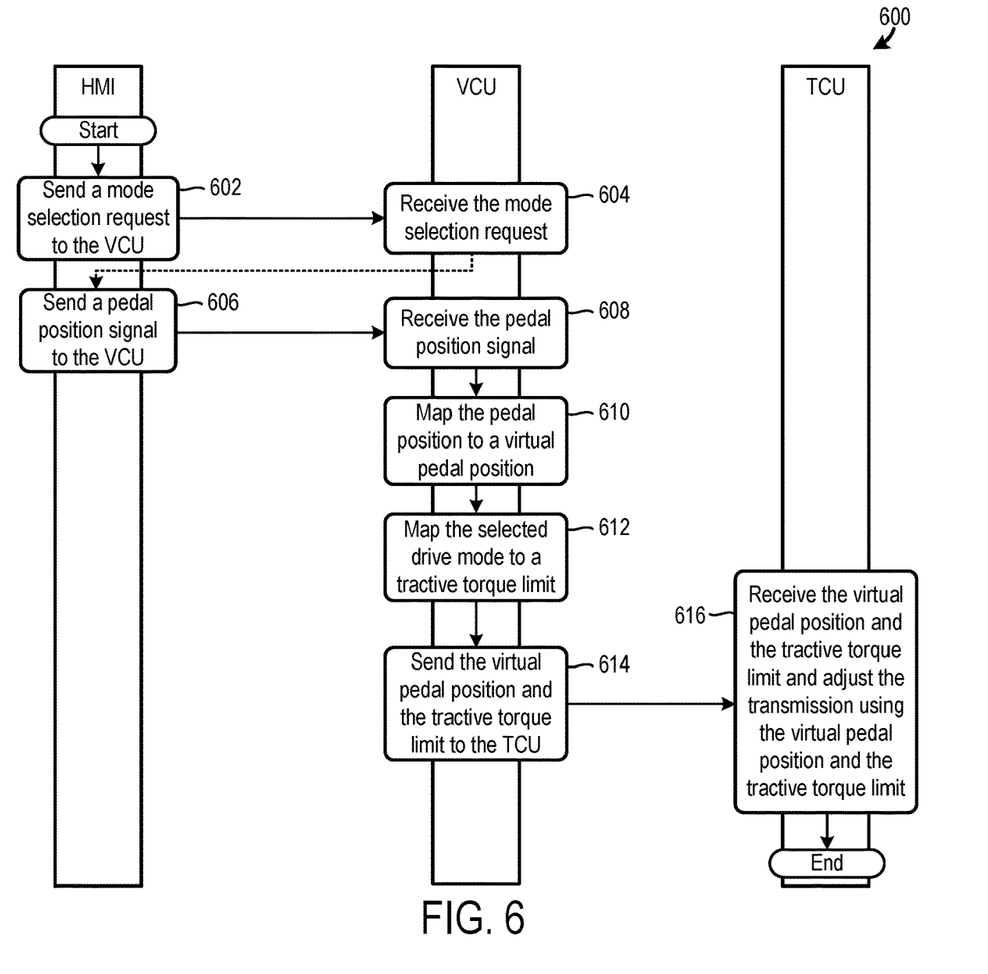

FIG. 6 illustrates a method 600 for operation of a control system in a vehicle. The method 600 is specifically implemented by a HMI, VCU, and TCU. These control system components may correspond to the HMI 126, VCU 122, and TCU 124 depicted in FIG. 1. However, the method may be implemented by other suitable control units and/or HMIs, in other embodiments.

At 602, the method includes sending a mode selection request to the VCU from the HMI. For instance, a vehicle operator may select a power mode, a normal mode, or an ECO mode. At 604, the method includes receiving the mode selection request at the VCU. After step 604, the method moves to step 606, as indicated via a dashed line.

At 606, the method includes sending a pedal position signal to the VCU from the HMI. The pedal position signal may correspond to a position of an accelerator pedal or a brake pedal. Next, at 608, the method includes receiving the pedal position signal at the VCU. Next, at 610, the method includes mapping the pedal position to a virtual pedal position at the VCU. For example, a curve, or more complicated function, may be used to map the pedal position to the virtual pedal position. The progressivity curve of virtual pedal vs. actual pedal position may have been previously adjusted by the customer to provide the customer with greater drivability parameter flexibility.

At 612, the method includes mapping or otherwise correlating the selected drive mode to a tractive torque limit, at the VCU. For instance, when a power mode is selected, a positive tractive torque limit during vehicle acceleration that is correlated to the power mode may be activated, and a negative tractive torque limit during vehicle deceleration that is correlated to the power mode may be activated.

At 614, the method includes sending the virtual pedal position and the tractive torque limit to the TCU from the VCU. This data may be sent over the CAN from a CAN bus at the VCU. In this way, the virtualized pedal position and the traction limits may be efficiently transferred between control units in the control system.

At 616, the method includes receiving the virtual pedal position and the tractive torque limit at the TCU and adjusting the transmission using the virtual pedal position and the tractive torque limit. For instance, in the power mode, depression of the accelerator pedal may cause the transmission to transfer a higher amount of positive torque to the transmission's output shaft in comparison to the ECO mode. Conversely, in the power mode, depression of the brake pedal may cause to transmission to transfer a greater amount of negative torque to the transmission's output shaft in comparison to the ECO mode of operation. In this way, the pedal signal may be virtualized by the VCU and then sent to the TCU for transmission control. As a result, the drivability parameters, that may have been previously adjusted by a customer to suit their preferences, may be efficiently applied to a control procedure of the vehicle system.

FIG. 7 shows a schematic depiction of a transmission 700 (e.g., an HVT) in a vehicle 702. The vehicle 702 and the transmission 700 are examples of the vehicle 100 and the transmission 106 depicted in FIG. 1. Therefore, the transmission 700 may include structural and/or function features from the transmission 106, or vice versa.

The transmission 700 may function as an IVT where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios.

The transmission 700 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, demand the use of an additional clutch which may increase system complexity.

The transmission 700 may include or receive power from a motive power source 704. The power source 704 may include an internal combustion engine, electric motor (e.g., electric motor-generator), combinations thereof, and the like.

A torsional damper coupling 706 may be further provided in the transmission. Gears 708, 710, such as bevel gears, may be used to rotationally couple the power source 704 to an input shaft 712. As described herein, a gear may be a mechanical component which rotates and includes teeth that are profiled to mesh with teeth in one or more corresponding gears to form a mechanical connection that allows rotational energy transfer therethrough.

A mechanical PTO 714 may be coupled to the input shaft 712. The mechanical PTO 714 may drive an auxiliary system such as a pump (e.g., a hydraulic pump, a pneumatic pump, and the like), a winch, a boom, a bed raising assembly, and the like. To accomplish the power transfer to auxiliary components, the PTO may include an interface, shaft(s), housing, and the like. However, in other examples, the PTO may be omitted from the transmission system. A gear 716 may be coupled to the input shaft 712. A mechanical assembly 718 is further included in the transmission 700. The mechanical assembly 718 may include the shaft 712 and/or the gear 716 as well as shaft 767, described in greater detail herein. Further, the transmission may include a shaft 720 and a gear 722 rotationally coupled to the gear 716 on the input shaft 712. Dashed line 724 and the other dashes lines depicted in FIG. 7 indicate a mechanical connection between components which facilitates rotational energy transfer therebetween.

A gear 726 meshing with gear 722 may be rotationally attached to a charging pump 728. The charging pump 728 may be designed to deliver pressurized fluid to hydraulic components in the transmission such as a hydraulic motor 734 (e.g., hydrostatic motor), a hydraulic pump 736 (e.g., hydrostatic pump), and the like. The charging pump may include a piston, a rotor, a housing, chamber(s), and the like to allow the pump to move fluid. The mechanical assembly 718 is rotationally coupled in parallel to a hydrostatic assembly 730 (e.g., a hydrostatic unit). Further, the hydrostatic assembly 730 may have a U-shape design where the shafts 731, 733 serve as a mechanical interface for the hydraulic pump 736 (e.g., variable displacement pump) and the hydraulic motor 734 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 730 may be arranged on an opposite side of the transmission as the charging pump 728 and/or axially offset from clutches 770, 772. Arranging the hydrostatic assembly in this manner permits the width of the transmission to be reduced and allows the installation of the transmission in the vehicle to be simplified. Further, the motor and the pump in the hydrostatic assembly may be enclosed a common housing to increase transmission compactness.

The coupling of the hydrostatic assembly to the mechanical assembly enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

The mechanical assembly 718 may include multiple mechanical paths that are coupled in parallel to the hydrostatic assembly. To elaborate, the shaft 767 may serve as a junction for a first mechanical path (e.g., branch) 719 and a second mechanical path (e.g., branch) 721. The first mechanical path 719 may provide rotational energy transfer capabilities from an interface of the hydrostatic assembly 730 to a ring gear 758 of a first planetary gear set 748, during certain operating conditions. Additionally, the second mechanical path 721 may provide rotational energy transfer capabilities from the interface of the hydrostatic assembly 730 to a carrier 760 of a second planetary gear set 750.

The hydrostatic assembly 730 includes the hydraulic motor 734 and the hydraulic pump 736. Further, the hydraulic pump 736 may include a first mechanical interface 738 and a second mechanical interface 740. The first mechanical interface 738 may be rotationally coupled to a mechanical bushing 732 and the second mechanical interface 740 may be rotationally coupled to another mechanical PTO 742. Again, the mechanical PTO may be used to drive an auxiliary vehicle system such as an air compressor, a mechanical arm or boom, an auger, and the like. In this way, the transmission may be adapted for a variety of operating environments. Providing multiple PTOs, in the arrangement depicted in FIG. 7, enables the transmission system to meet end-use design goals in a variety of different types of vehicles, if wanted. As such, the system's applicability is expanded and the customer appeal of the transmission is increased. However, in other examples, the PTO 714 and/or the PTO 742 may be omitted from the transmission.

The hydraulic pump 736 may be a variable displacement bi-directional pump, in one example. Further, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 734 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 744, 746 are attached to hydraulic interfaces in each of the motor and pump to enable the hydrostatic assembly to provide additive and power circulation functionality with regard to the mechanical branches arranged in parallel with the hydrostatic assembly 730. For example, in an additive power mode, power from both the hydrostatic and mechanical assemblies is combined at one of the planetary gear sets and delivered to the transmission output. Therefore, the hydraulic pump 736 and the motor 734 may be operated to flow power to the sun gears of either planetary assembly from the hydraulic motor. In a power split mode, power is recirculated through the hydrostatic assembly. Therefore, in the power split mode, power flows from the hydrostatic assembly to the shaft 720.

The transmission 700 may further include the first planetary gear set 748 and the second planetary gear set 750. The first planetary gear set 748 may include a carrier 752 on which planet gears 754 rotate. The planet gears 754 may mesh with a sun gear 756 and the ring gear 758. Likewise, the second planetary gear set 750 may include the carrier 760, planet gears 762, a sun gear 764, and a ring gear 766. Therefore, the second planetary gear set 750 may again be a simple planetary gear set. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motion.

The carrier 760 of the second planetary gear set 750 may be rotationally coupled to the ring gear 758 of the first planetary gear set 748. Further, the carrier 760 of the second planetary gear set 750 may be rotationally coupled to a shaft 767. The shaft 767 may extend through a central opening in an extension 786, described in greater detail herein. This rotational attachment scheme may be conceptually described as a formation of mechanical branches attached in parallel to the hydrostatic assembly 730.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased, which allows gains in operating efficiency to be realized, when compared to purely hydrostatic transmissions.

The sun gears 756, 764 of the first and second planetary gear sets 748, 750 may be rotationally coupled (e.g., directly attached) to one another. Attaching the sun gears in this manner may enable the transmission to achieve a desired gear ratio, compactness, and efficiency.

The hydraulic motor 734 may be rotationally coupled to the sun gear 756 via a mechanical bushing 768, for instance. The transmission 700 further includes a reverse clutch 770, a first forward drive clutch 772, and a second forward drive clutch 774. The clutches 770, 772, 774 may be positioned near to an output shaft 771 and downstream of the planetary assembly. The output shaft may more generally serve as the transmission's output. Arranging the clutches in this location allows a targeted compromise between clutch size and clutch speed. For instance, relatively high clutch speeds may generate higher power losses. Further, the reverse clutch 770 and the first forward drive clutch 772 may be arranged adjacent and coaxial to one another. In one particular example, the clutches may have a similar design to reduce manufacturing complexity. This twin clutch arrangement therefore permits manufacturing costs to be reduced and increases the transmission's compactness.

The clutches 770, 772, 774 may be friction clutches that each includes two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. The carrier 752 may include an extension 775 with a gear 776 that meshes with a gear 777. The gear 777, in the illustrated example, is rotationally coupled to the reverse clutch 770 and the first forward clutch 772. The reverse clutch 770 and the first forward clutch 772 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 779 may reside on an output shaft 780 of the reverse clutch 770. Likewise, a gear 781 may reside on an output shaft 782 of the first forward clutch 772. Both gears 779, 781 may be rotationally attached to the system output shaft 771 via gears 783, 784 respectively. In this way, both the reverse clutch and the first forward clutch deliver power to the transmission's output, during different operating conditions.

The system output shaft 771 may include one or more interfaces 785 (e.g., yokes, gears, chains, combinations thereof, and the like). The output shaft is specifically illustrated with two outputs. However, the transmission may include an alternate numbers of outputs. The gear 779 is rotationally coupled to the output shaft via meshing with gear 783. Arrows 791 depict the flow of power from the transmission system to drive axles 792 and/or other suitable downstream vehicle components or vice versa. A driveline with a shaft, joints, and the like may be used to carry out the power transfer between the transmission and the axles. It will be understood that the drive axles may include drive wheels.

The ring gear 766 of the second planetary gear set 750 may include the extension 786 with a gear 787 position thereon. The gear 787 may be rotationally attached to a gear 788 in the second forward clutch 774, as indicated via a dashed line. The gear 788 may be coupled to a first set of plates in the clutch 774. A second set of plates in the clutch may be attached to an output shaft 789 and a gear 790. The gear 790 may be rotationally coupled to the gear 783, as indicated by a dashed line. Due to the aforementioned arrangement of the clutches and the planetary gear sets, the transmission 700 achieves a higher efficiency and enhanced drivability, comfort, and productivity than previous hydromechanical transmissions.

The technical effect of the vehicle system operating methods described herein is to increase drivability parameter adjustability to permit customers to efficiently tune the parameters to achieve desired responses from a transmission control unit and the vehicle's tractive performance, correspondingly. Consequently, customer appeal of the vehicle system is increased by providing greater flexibility of a selected set of drivability parameters.

The invention will be further described in the following paragraphs. In one aspect, a vehicle control unit (VCU) designed to electronically communicate with a human machine interface (HMI); wherein the VCU includes instructions that when executed, in reaction to receiving an acceleration or deceleration request from the HMI, cause the VCU to: send a virtual acceleration or deceleration command to a transmission control unit (TCU), wherein the virtual acceleration or deceleration command correlates to the acceleration or deceleration request; wherein the correlation is a user adjustable parameter provided in a user interface (UI) of the VCU.

In another aspect, a method for operation of a vehicle system is provided that comprises receiving an acceleration or deceleration request at a vehicle control unit (VCU) sent from a human machine interface (HMI); in response to receiving the acceleration or deceleration request at the VCU, generating a virtual acceleration or deceleration command mapped to the acceleration or deceleration request; and sending the virtual acceleration or deceleration command to a transmission control unit (TCU) from the VCU; wherein the mapping between the acceleration or deceleration request and command is a user adjustable parameter. Further in one example, the method may further comprise, at the TCU, adjusting a transmission using the virtual acceleration or deceleration request based on the acceleration or deceleration request, to adjust the amount of torque transferred between the transmission and a drive axle. In yet another example, the method may further comprise receiving a pedal mapping adjustment request, represented via a progressivity curve, at the VCU. In another example, the method may further comprise receiving a tractive torque constraint adjustment request at the VCU; sending the tractive torque constraint from the VCU to the TCU; and at the TCU operating the transmission based on the tractive torque constraint.

In yet another aspect, a vehicle system is provided that comprises a vehicle control unit (VCU) in electronic communication with a human machine interface (HMI); and a hydromechanical transmission coupled to a drive axle; wherein the VCU includes instructions that when executed, in reaction to receiving the pedal position from the HMI, cause the VCU to: send a virtual pedal position and one or more tractive torque constraints to a transmission control unit (TCU), wherein the virtual pedal position maps to the pedal position; wherein the TCU includes instructions that when executed cause the TCU to: apply tractive torque at an output of the hydromechanical transmission based on the virtual pedal position and the one or more tractive torque constraints.

In any of the aspects or combinations of the aspects, the transmission may be a hydromechanical transmission.

In any of the aspects or combinations of the aspects, the TCU may include instructions that when executed cause the TCU to: distribute tractive torque to a transmission output based on the virtual acceleration or deceleration command.

In any of the aspects or combinations of the aspects, the VCU may include instructions that when executed cause the VCU to: send a user designated tractive torque constraint to the TCU; wherein distributing the tractive torque between the transmission and the drive axle is based on the user designated tractive torque constraint and the virtual acceleration or deceleration command.

In any of the aspects or combinations of the aspects, the acceleration or deceleration request may be an acceleration request, the tractive torque constraint may be a positive tractive torque constraint, the transmission may be a hydromechanical transmission, and the TCU may include instructions that when executed cause the TCU to: adjust a mechanical branch and/or a hydraulic branch in the hydromechanical transmission to achieve a target transmission ratio based on the positive tractive torque constraint.

In any of the aspects or combinations of the aspects, the correlation may correspond to one of a plurality of drive modes.

In any of the aspects or combinations of the aspects, the plurality of drive modes may include a power mode, a normal mode, and an ECO mode.

In any of the aspects or combinations of the aspects, the VCU and the TCU may be in electronic communication via a controller area network (CAN) bus interface.

In any of the aspects or combinations of the aspects, the correlation between the virtual acceleration or deceleration command and the acceleration or deceleration request may include a progressivity curve.

In any of the aspects or combinations of the aspects, the HMI may include an accelerator pedal and/or a brake pedal.

In any of the aspects or combinations of the aspects, the mapping between the virtual pedal position and the pedal position as well as the one or more tractive torque constraints may be user adjustable parameters presented in an interface of the VCU.

In any of the aspects or combinations of the aspects, the virtual pedal position and the one or more tractive torque constraints may be sent to the TCU via a controller area network (CAN) bus interface in the VCU.

In any of the aspects or combinations of the aspects, applying the tractive torque to the output of the hydromechanical transmission may include adjusting a mechanical branch and a hydraulic branch in the hydromechanical transmission to achieve a target transmission ratio based on the one or more tractive torque constraints.

In any of the aspects or combinations of the aspects, the one or more tractive torque constraints may correspond to an operator designated drive mode.

In another representation, a vehicle control system is provided with a vehicle controller that is designed to generate an interface which permits adjustment of a pedal progressivity parameter and a transmission output torque limit and send virtual pedal data mapped to the pedal progressivity parameter and the output torque limit to a transmission controller via a controller area network (CAN).

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
a vehicle control unit (VCU) electronically communicating with a human machine interface (HMI) device;
wherein the VCU includes instructions stored in memory that, when executed by a processor, in reaction to receiving an ECO mode selection request from a user interface (UI) of the VCU, cause the VCU to:
operate the vehicle system in the ECO mode;
wherein the VCU includes instructions stored in memory that, when executed by a processor, in reaction to receiving an acceleration or deceleration request from the HMI device, cause the VCU to:
map the acceleration or deceleration request to a virtual acceleration or deceleration command to correlate the acceleration or deceleration request to the virtual acceleration or deceleration command; and
send the virtual acceleration or deceleration command to a transmission control unit (TCU) for a hydromechanical transmission;
wherein the correlation is user adjustable via the UI of the VCU;
wherein the TCU includes instructions that, when executed, cause the TCU to:
distribute tractive torque to a transmission output based on the virtual acceleration or deceleration command;
wherein the acceleration or deceleration request is mapped to the virtual acceleration or deceleration command using a progressivity curve which indicates an actual pedal position value defined on a y-axis and a virtual pedal position value defined on an x-axis;
wherein the progressivity curve corresponds to the ECO mode;
wherein a maximum value of the virtual pedal position in the ECO mode is less than a maximum value of a virtual pedal position in a power mode;
wherein the ECO mode is user truncated such that the progressivity curve is constrained to an upper torque limit;
wherein the HMI includes one or more input devices;
wherein the UI is presented on a display;
wherein the VCU and the TCU are in communication over a controller area network (CAN);
wherein the VCU includes a first microprocessor and a first memory;
wherein the TCU includes a second microprocessor and a second memory;
wherein the first microprocessor is different than the second microprocessor;
wherein the first memory is different from the second memory; and
wherein the VCU is configured to coordinate operation of the TCU and an engine control unit (ECU).

2. The vehicle system of claim 1, wherein the VCU includes instructions that, when executed, cause the VCU to:
send a user designated tractive torque constraint to the TCU;
wherein distributing the tractive torque to the transmission output is based on the user designated tractive torque constraint and the virtual acceleration or deceleration command.

3. The vehicle system of claim 2, wherein the acceleration or deceleration request is an acceleration request, the user designated tractive torque constraint is a positive tractive torque constraint, the transmission is a hydromechanical transmission, and the TCU includes instructions that, when executed, cause the TCU to:
adjust a mechanical branch and/or a hydraulic branch in the hydromechanical transmission to achieve a target transmission ratio based on the positive tractive torque constraint.

4. The vehicle system of claim 1, wherein the hydromechanical transmission is a hydromechanical variable transmission (HVT) that includes:
a mechanical assembly with two forward drive clutches and one reverse drive clutch; and
a hydrostatic assembly including a hydraulic motor and a hydraulic pump that mechanically coupled to multiple mechanical branches in the mechanical assembly;
wherein during operation of the HVT power synchronously flows through the mechanical assembly and the hydrostatic assembly to additively combine or recirculate power through the HVT.

5. The vehicle system of claim 4, wherein distributing the tractive torque to the transmission output includes adjusting the hydrostatic assembly to alter power flow through the hydrostatic assembly.

6. The vehicle system of claim 4, wherein the hydromechanical transmission includes multiple planetary gear sets.

7. The vehicle system of claim 1, wherein the actual pedal position value and the virtual pedal position value are each expressed as a percentage of maximum pedal depression.

8. The vehicle system of claim 1, wherein the HMI device includes an accelerator pedal and/or a brake pedal.

9. A method for operation of a vehicle system, comprising:
receiving an ECO mode selection request from a user interface (UI) of a vehicle control unit (VCU);
operating the vehicle system in the ECO mode;
receiving an acceleration or deceleration request at the VCU sent from a human machine interface (HMI) device; and
in response to receiving the acceleration or deceleration request at the VCU,
mapping the acceleration or deceleration request to a virtual acceleration or deceleration command to correlate the acceleration or deceleration request to the virtual acceleration or deceleration command;
sending the virtual acceleration or deceleration command to a transmission control unit (TCU) from the VCU; and
at the TCU, adjusting a transmission using the virtual acceleration or deceleration command to adjust an amount of torque transferred between the transmission and a drive axle;
wherein the mapping between the acceleration or deceleration request and command is user adjustable;
wherein the acceleration or deceleration request is mapped to the virtual acceleration or deceleration command using a first progressivity curve which indicates an actual pedal position value defined on a y-axis and a virtual pedal position value defined on an x-axis;
wherein the first progressivity curve corresponds to the ECO mode;
wherein a maximum value of the virtual pedal position in the ECO mode is less than a maximum value of a virtual pedal position in a power mode;
wherein the ECO mode is user truncated such that the first progressivity curve is constrained to an upper torque limit;
wherein the HMI includes one or more input devices;
wherein the UI is presented on a display;
wherein the VCU and the TCU are in communication over a controller area network (CAN);
wherein the VCU includes a first microprocessor and a first memory;
wherein the TCU includes a second microprocessor and a second memory;
wherein the first microprocessor is different than the second microprocessor;
wherein the first memory is different from the second memory; and
wherein the VCU is configured to coordinate operation of the TCU and an engine control unit (ECU).

10. The method of claim 9, wherein the transmission is a hydromechanical transmission.

11. The method of claim 9, further comprising receiving a pedal mapping adjustment request, represented via a second progressivity curve, at the VCU.

12. The method of claim 9, further comprising:
receiving a tractive torque constraint adjustment request at the VCU;
sending the tractive torque constraint from the VCU to the TCU; and
at the TCU, operating a transmission based on the tractive torque constraint;
wherein the tractive torque constraint corresponds to a maximum output torque value applied at the transmission's output.

13. A vehicle system, comprising:
a vehicle control unit (VCU) in electronic communication with a human machine interface (HMI) device; and
a hydromechanical transmission coupled to a drive axle;
wherein the VCU includes instructions stored in memory that, when executed by a processor, in reaction to receiving an ECO mode selection request from a user interface (UI) of the VCU, cause the VCU to:
operate the vehicle system in the ECO mode;
wherein the VCU includes instructions that, when executed, in reaction to receiving a pedal position from the HMI device, cause the VCU to:
map the pedal position to a virtual acceleration or deceleration command to correlate the pedal position to the virtual acceleration or deceleration command; and
send a virtual pedal position and one or more tractive torque constraints to a transmission control unit (TCU);
wherein the TCU includes instructions that, when executed, cause the TCU to:
apply tractive torque at an output of the hydromechanical transmission based on the virtual pedal position and the one or more tractive torque constraints;
wherein the one or more tractive torque constraints correspond to a maximum output torque value applied at the output of the hydromechanical transmission;
wherein the pedal position is mapped to the virtual acceleration or deceleration command using a progressivity curve which indicates an actual pedal position value defined on a y-axis and a virtual pedal position value defined on an x-axis;
wherein the progressivity curve corresponds to the ECO mode;
wherein a maximum value of the virtual pedal position in the ECO mode is less than a maximum value of a virtual pedal position in a power mode;
wherein the ECO mode is user truncated such that the progressivity curve is constrained to an upper torque limit;
wherein the HMI includes one or more input devices;
wherein the UI is presented on a display;
wherein the VCU and the TCU are in communication over a controller area network (CAN);
wherein the VCU includes a first microprocessor and a first memory;
wherein the TCU includes a second microprocessor and a second memory;
wherein the first microprocessor is different than the second microprocessor;
wherein the first memory is different from the second memory; and
wherein the VCU is configured to coordinate operation of the TCU and an engine control unit (ECU).

14. The vehicle system of claim 13, wherein the mapping between the virtual pedal position and the pedal position as well as the one or more tractive torque constraints are user adjustable and presented in the UI on a display of the VCU.

15. The vehicle system of claim 13, wherein the virtual pedal position and the one or more tractive torque constraints are sent to the TCU via a controller area network (CAN) bus interface in the VCU.

16. The vehicle system of claim 13, wherein the HMI device includes an accelerator pedal and/or a brake pedal.

17. The vehicle system of claim 13, wherein applying the tractive torque to the output of the hydromechanical transmission includes:
  adjusting a mechanical branch and a hydraulic branch in the hydromechanical transmission to achieve a target transmission ratio based on the one or more tractive torque constraints.

18. The vehicle system of claim 13, wherein the one or more tractive torque constraints correspond to an operator designated drive mode.

* * * * *